US012001538B2

(12) United States Patent
Go et al.

(10) Patent No.: US 12,001,538 B2
(45) Date of Patent: Jun. 4, 2024

(54) ON-BOARD COMPUTER, COMPUTER EXECUTION METHOD, AND COMPUTER PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Darmawan Go, Yokkaichi (JP); Kenta Ogata, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 318 days.

(21) Appl. No.: 17/601,782

(22) PCT Filed: Feb. 21, 2020

(86) PCT No.: PCT/JP2020/007071
§ 371 (c)(1),
(2) Date: Oct. 6, 2021

(87) PCT Pub. No.: WO2020/208952
PCT Pub. Date: Oct. 15, 2020

(65) Prior Publication Data
US 2022/0207129 A1    Jun. 30, 2022

(30) Foreign Application Priority Data
Apr. 9, 2019  (JP) ................................. 2019-074322

(51) Int. Cl.
G06F 21/44      (2013.01)
B60R 16/023    (2006.01)
G06F 8/60       (2018.01)

(52) U.S. Cl.
CPC ............ G06F 21/44 (2013.01); B60R 16/023 (2013.01); G06F 8/60 (2013.01)

(58) Field of Classification Search
CPC ..................................................... G06F 21/44
See application file for complete search history.

(56) References Cited

U.S. PATENT DOCUMENTS 10,754,558 B2    8/2020  Ishiguro

FOREIGN PATENT DOCUMENTS

JP    2010-250620 A    11/2010
JP    2013-148938 A     8/2013
(Continued)

OTHER PUBLICATIONS

International Preliminary Report on Patentability for PCT/JP2020/007071, Report completed on: Apr. 5, 2021, 4 pages. (Year: 2021 ).*
(Continued)

*Primary Examiner* — Ponnoreay Pich
(74) *Attorney, Agent, or Firm* — Honigman LLP (57) ABSTRACT

An on-board computer includes a physical resource having a communication unit which communicate with an on-board control device through an on-board communication line, a control unit, and a storage unit. The on-board computer further includes a connection unit to which an external device is to be connected; and a management processing unit configured to generate a virtual control device by allocating the physical resource in a case where the external device is connected to the connection unit, wherein the virtual control device operates as a virtual on-board control device that controls an operation of the external device connected to the (Continued)

connection unit, and that is connected to the on-board communication line.

11 Claims, 8 Drawing Sheets

(56) References Cited

FOREIGN PATENT DOCUMENTS

| | | | |
|---|---|---|---|
| JP | 2013-175232 | A | 9/2013 |
| JP | 2014-222468 | A | 11/2014 |
| JP | 2015-195491 | A | 11/2015 |
| JP | 2016-060328 | A | 4/2016 |
| JP | 2016-062140 | A | 4/2016 |
| JP | 2019-034684 | A | 3/2019 |

OTHER PUBLICATIONS

International Search Report, Application No. PCT/JP2020/007071, dated Jun. 2, 2020. ISA/Japan Patent Office.

* cited by examiner

ON-BOARD COMPUTER, COMPUTER EXECUTION METHOD, AND COMPUTER PROGRAM

CROSS-REFERENCE TO RELATED APPLICATIONS

This application is the U.S. national stage of PCT/JP2020/007071 filed on Feb. 21, 2020, which claims priority of Japanese Patent Application No. JP 2019-074322 filed on Apr. 9, 2019, the contents of which are incorporated herein.

TECHNICAL FIELD

The present disclosure relates to an on-board computer, a computer execution method, and a computer program.

BACKGROUND

A plurality of electronic control units (hereinafter, referred to as "ECUs") connected to an on-board network are mounted in a vehicle. For example, the plurality of ECUs are grouped for every domain such as a power train system, a body system, and an air conditioning system, and are connected to a central gateway.

In recent years, the on-board network becomes complicated in accordance with introduction of a connected car function always connected to the Internet, an over the air (OTA) reprogramming function, an advanced driver-assistance systems (ADAS), an automatic driving technology, an artificial intelligence technology, and the like, and thus secure management and cooperative operation control of a device that is additionally connected to the ECU or the on-board network are difficult to be carried out.

With regard to the ECUs to which devices are externally connected, Japanese Patent Laid-Open Publication No. 2016-60328 discloses an on-board device including a connection port to which a plug-and-play compliant device is capable of being externally connected. For example, the device is a storage device for operation log writing.

On the other hand, Japanese Patent Laid-Open Publication No. 2017-87773 discloses an on-board device capable of causing a plurality of function processing units to independently operate by causing a physical processor to operate in parallel as a plurality of virtual processor cores by a virtualization technology using a hypervisor or the like. The on-board device according to Japanese Patent Laid-Open Publication No. 2017-87773 includes a function domain that executes an application, and a backup processing domain that writes backup data of the application from a volatile memory to a non-volatile memory, and the domains independently operate.

In Japanese Patent Laid-Open Publication No. 2016-60328, when a device connected to the connection port is caused to operate directly on an OS of the on-board device, there is a concern that the device may have an adverse effect on other applications during operation. In addition, a cooperative operation between an externally connected device and another ECU connected to the on-board network is not considered. Japanese Patent Laid-Open Publication No. 2017-87773 does not disclose a management technology of an additional device.

SUMMARY

An object of the present disclosure is to provide an on-board computer, a computer execution method, and a computer program which are capable of causing an external device to operate in a secure manner when the external device is connected to the on-board computer, and are capable of connecting the external device to an on-board network in an aspect capable of operating cooperatively with another on-board control device.

An on-board computer of the present aspect comprises a physical resource including a communication unit which communicate with an on-board control device through an on-board communication line, a control unit, and a storage unit; a connection unit to which an external device is to be connected; and a management processing unit configured to generate a virtual control device by allocating the physical resource in a case where the external device is connected to the connection unit, wherein the virtual control device operates as a virtual on-board control device that controls an operation of the external device connected to the connection unit, and that is connected to the on-board communication line.

A computer execution method of the present aspect wherein an on-board computer including a physical resource including a communication unit which communicate with an on-board control device through an on-board communication line, a control unit, and a storage unit, and a connection unit to which an external device is to be connected executes processes of determining whether or not the external device is connected to the connection unit, and generating a virtual control device by allocating the physical resource in a case where a determination is made as establishment of connection of the external device to the connection unit, and the virtual control device operates as a virtual on-board control device that controls an operation of the external device connected to the connection unit, and that is connected to the on-board communication line.

A computer program of the present aspect causes an on-board computer including a physical resource including a communication unit which communicate with an on-board control device through an on-board communication line, a control unit, and a storage unit, and a connection unit to which an external device is to be connected to execute processes of: determining whether or not the external device is connected to the connection unit; generating a virtual control device by allocating the physical resource in a case where a determination is made as establishment of connection of the external device to the connection unit; and causing the virtual control device to operate as a virtual on-board control device that controls an operation of the external device connected to the connection unit, and that is connected to the on-board communication line.

Note that, this application can be realized not only as a management processing unit including the specific processing units, but also as a management processing method including the specific process as a step, or as a program causing a computer to execute the step, as described above. In addition, this application can be realized as a semiconductor integrated circuit that realizes a part or the entirety of the management processing unit, or as other systems including the management processing unit.

Effects of Present Disclosure

According to the present disclosure, it is possible to provide an on-board computer, a computer execution method, and a computer program which are capable of causing an external device to operate in a secure manner when the external device is connected to the on-board computer, and are capable of connecting the external device

DETAILED DESCRIPTION OF PREFERRED EMBODIMENTS

First, embodiments of the present disclosure will be listed and described. In addition, at least parts of the following embodiments may be arbitrarily combined.

An on-board computer of the present aspect comprises a physical resource including a communication unit which communicate with an on-board control device through an on-board communication line, a control unit, and a storage unit; a connection unit to which an external device is to be connected; and a management processing unit configured to generate a virtual control device by allocating the physical resource in a case where the external device is connected to the connection unit, wherein the virtual control device operates as a virtual on-board control device that controls an operation of the external device connected to the connection unit, and that is connected to the on-board communication line.

According to this aspect, in a case where the external device is connected to the connection unit, the management processing unit generates the virtual control device configured to control the operation of the external device by allocating the physical resource of the on-board computer. In other words, the virtual control device operates as a virtual on-board control device connected to the on-board communication line in substitution for the external device. Since the virtual control device related to the external device is a device that operates in a virtual environment, it is possible to reduce an adverse effect on an OS of the on-board computer and an external on-board control device. In addition, since the external device can function as a virtual control device connected to the on-board communication line, it enters a state in which a cooperative operation such as transmission and reception of data to and from another on-board control device becomes possible.

Note that, the external device is not limited to a computer device, and includes an arbitrary device or equipment that may have an effect on an operation of an on-board computer, another on-board control device connected to the on-board communication line, and the like. Examples thereof include a device including an actuator, a device including a sensor, an image display device, an audio device, a communication device, a failure diagnosis device, and the like.

It is preferable that the management processing unit performs authentication of the external device in a case where the external device is connected to the connection unit, and generates the virtual control device in a case where authentication succeeds.

According to this aspect, after performing authentication of the external device, the virtual control device of the external device is generated, and thus security can be improved.

It is preferable that the management processing unit acquires a program for causing the virtual control device related to the external device to operate from an external server, and provides the acquired program to the virtual control device.

According to this aspect, since the program for causing the external device to operate as the virtual control device is acquired from the external server, it is not necessary for the storage unit of the on-board computer to store a program for the external device. That is, capacity of the storage unit can be reduced.

It is preferable that the management processing unit acquires a program for causing the virtual control device related to the external device to operate from the external device, and provides the acquired program to the virtual control device.

According to this aspect, since the program for causing the external device to operate as the virtual control device is acquired from the external device, it is not necessary for the storage unit of the on-board computer to store a program for the external device. That is, capacity of the storage unit can be reduced.

It is preferable that the management processing unit transmits information for displaying progress of a process of generating the virtual control device.

According to this aspect, since the information for displaying a progress situation of the process of generating the virtual control device is transmitted, a user can confirm the progress related to the process of generating the virtual control device.

It is preferable that the management processing unit deletes the virtual control device in a case where the external device is detached from the connection unit.

According to this aspect, in a case where the external device is detached from the connection unit, the virtual control device can be deleted, and the physical resource can be released.

It is preferable that the virtual control device is retained before elapse of predetermined time from detachment of the external device from the connection unit, and the virtual control device is deleted after elapse of the predetermined time.

According to this aspect, in a case where the external device is detached from the connection unit, the virtual control device is deleted after waiting elapse of predetermined time, and thus in a case where the external device is reconnected within the predetermined time, the virtual control device related to the external device can be used instantly.

It is preferable that the management processing unit monitors an operation of the virtual control device, and deletes the virtual control device in a case where the operation of the virtual control device is abnormal.

According to this aspect, in a case where the operation of the virtual control device is abnormal, the virtual control device can be deleted. Accordingly, security of an on-board system can be improved.

It is preferable that the management processing unit stores logs of generation, operation, and deletion of the virtual control device.

According to this aspect, logs related to generation, operation, and deletion of the virtual control device can be left.

A computer execution method of the present aspect wherein an on-board computer including a physical resource including a communication unit which communicate with an on-board control device through an on-board communication line, a control unit, and a storage unit, and a connection unit to which an external device is to be connected executes processes of determining whether or not the external device is connected to the connection unit, and generating a virtual control device by allocating the physical resource in a case where a determination is made as establishment of connection of the external device to the connection unit, and the virtual control device operates as a virtual on-board control device that controls an operation of the external device connected to the connection unit, and that is connected to the on-board communication line.

According to this aspect, as described above, in a case where the external device is connected to the on-board computer, it is possible to cause the external device to operate in a secure manner. In addition, the external device can be connected to the on-board network in an aspect capable of performing a cooperative operation with another on-board control device.

A computer program of the present aspect causes an on-board computer including a physical resource including a communication unit which communicate with an on-board control device through an on-board communication line, a control unit, and a storage unit, and a connection unit to which an external device is to be connected to execute processes of: determining whether or not the external device is connected to the connection unit; generating a virtual control device by allocating the physical resource in a case where a determination is made as establishment of connection of the external device to the connection unit; and causing the virtual control device to operate as a virtual on-board control device that controls an operation of the external device connected to the connection unit, and that is connected to the on-board communication line.

According to this aspect, in a case where the external device is connected to the on-board computer, it is possible to cause the external device to operate in a secure manner. In addition, the external device can be connected to the on-board network in an aspect capable of performing a cooperative operation with another on-board control device.

Hereinafter, the on-board communication system according to the embodiment of the present disclosure will be described with reference to the accompanying drawings. Note that, the scope of the invention is represented by the appended claims rather than being limited to exemplification, and is intended to include meaning equivalent to the appended claims and all modification in the scope.

Figure 1:
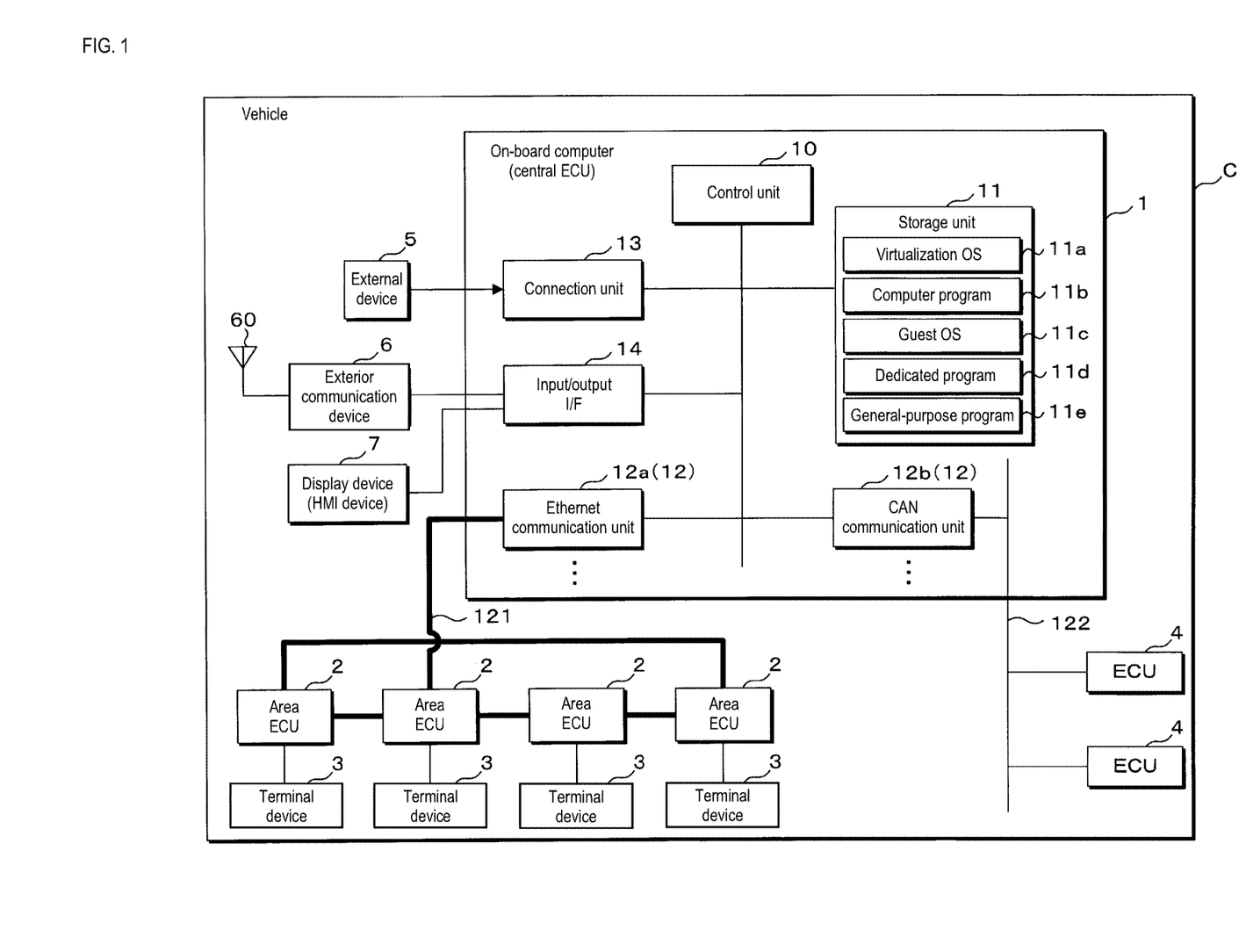
FIG. 1 is a block diagram illustrating a configuration example of an on-board communication system.
Figure 2:
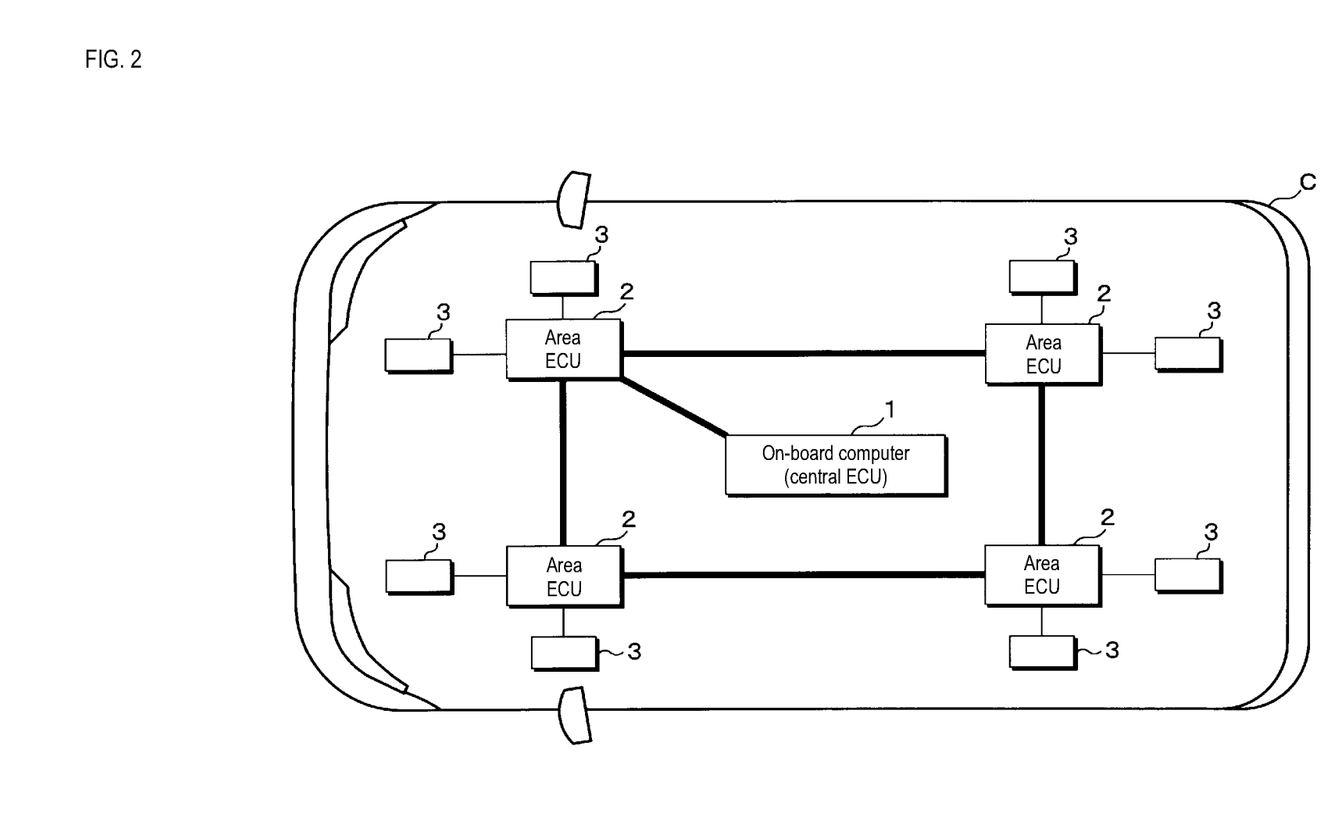
FIG. 2 is a block diagram illustrating a network configuration of the on-board communication system.
Figure 3:
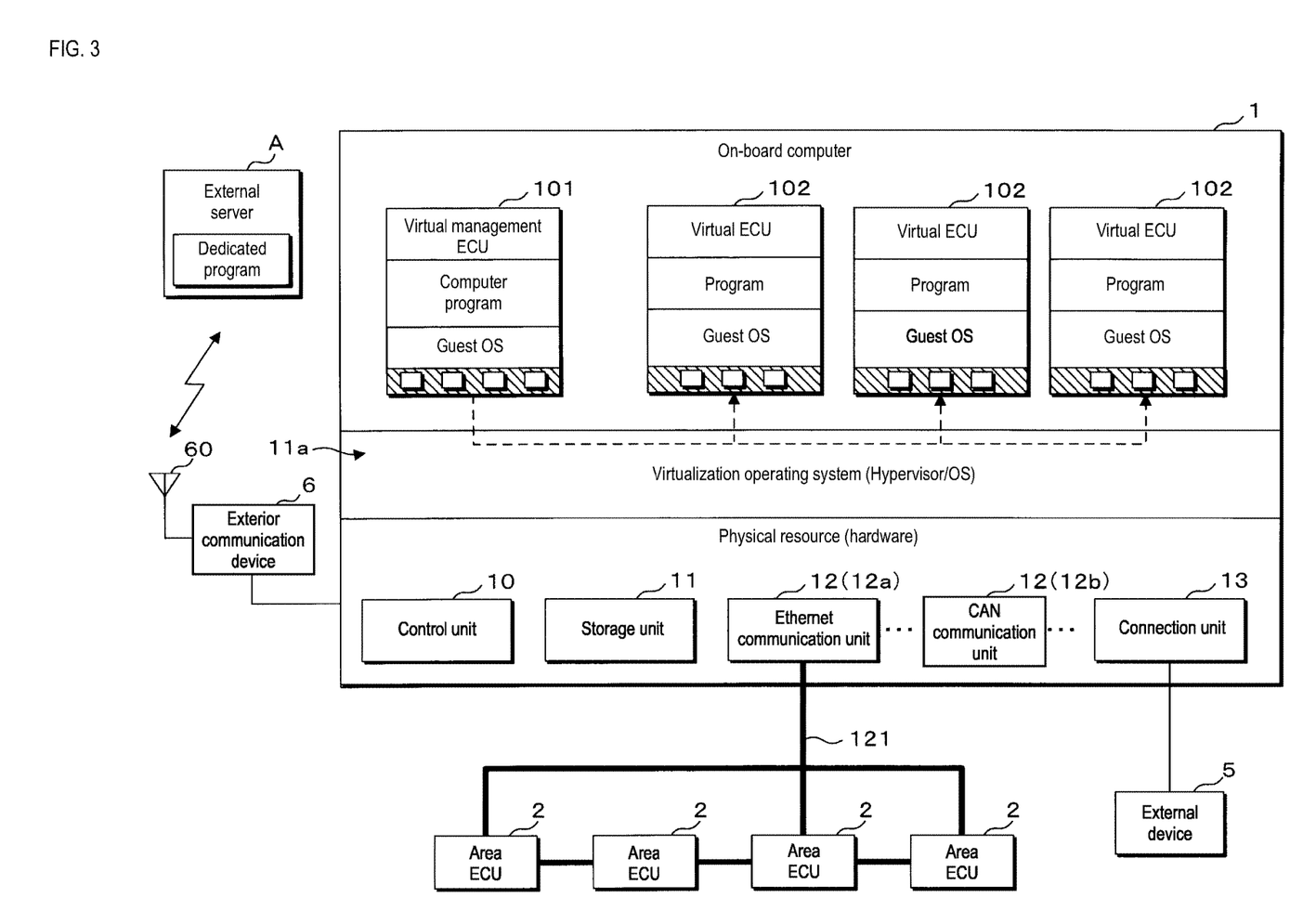
FIG. 3 is a functional block diagram of an on-board computer.

Hereinafter, the present disclosure will be described in detail with reference to the accompanying drawings illustrating an embodiment. FIG. 1 is a block diagram illustrating a configuration example of the on-board communication system, FIG. 2 is a block diagram illustrating a network configuration of the on-board communication system, and FIG. 3 is a functional block diagram of an on-board computer 1.

The on-board communication system according to this embodiment includes the on-board computer 1, a plurality of area ECUs 2, a terminal device 3 connected to each of the area ECUs 2, a plurality of ECUs 4, an external device 5, an exterior communication device 6, and a display device 7. The plurality of area ECUs 2 and ECUs 4 are connected to the on-board computer 1 by a first on-board communication line 121 and a second on-board communication line 122, respectively. The exterior communication device 6 and the display device 7 are connected to an input/output I/F 14 of the on-board computer 1. The external device 5 is detachably connected to a connection unit 13 of the on-board computer 1. For example, the external device 5 is a computer device. However, the external device 5 is not limited to the computer device, and includes an arbitrary device or equipment that may have an effect on an operation of the on-board computer 1, the area ECUs 2 connected to the first on-board communication line 121, and the ECUs 4 connected to the second on-board communication line 122. Examples of the external device 5 include a device including an actuator, a device including a sensor, an image display device, an audio device, a communication device, and a failure diagnosis device.

The on-board computer 1 includes a control unit 10, a storage unit 11, a communication unit 12, a connection unit 13, and the input/output I/F 14. The on-board computer 1 is also referred to as "central ECU". The communication unit 12 includes one or a plurality of Ethernet (registered trademark) communication units 12a and one or a plurality of control area network (CAN) communication units 12b. Note that, in this embodiment, description will be given of an example in which both the Ethernet communication unit 12a and the CAN communication unit 12b are provided, but only the Ethernet communication unit 12a may be provided.

The storage unit 11 includes a volatile memory element such as a random access memory (RAM), and a non-volatile memory element such as a flash memory and an electrically erasable programmable read only memory (EEPROM). The storage unit 11 stores a virtualization operating system (virtualization OS) 11a, a computer program (computer PG) 11b, a guest OS 11c, a dedicated program 11d, and a general-purpose program 11e according to this embodiment, and various pieces of data necessary for an operation of the control unit 10. In addition, the storage unit 11 stores a table showing a correspondence relationship between identification information of the external device 5, the guest OS 11c that is suitable for causing the external device 5 to operate as a virtual ECU 102, and the dedicated program 11d or the general-purpose program 11e.

For example, the virtualization operating system 11a is a hypervisor. The virtualization operating system 11a has a function of constructing a plurality of virtual environments, in which the virtual ECU 102 can operate, on the virtualization operating system 11a. The virtual environments include a virtual control unit, a virtual storage unit, a virtual Ethernet communication unit, a virtual CAN communication unit (a blank block in FIG. 3), and the like which are formed by allocating a physical resource including the control unit 10, the storage unit 11, the communication unit 12, and the like. The virtual ECU 102 operates as the actual physical area ECU 2 or ECU 4 by causing the guest OS 11c and various programs on virtual hardware thereof. That is, the virtual ECU 102 can communicate with other area ECUs 2 and ECUs 4 as each of the area ECUs 2 connected to the first on-board communication line 121 or each of the area ECUs 4 connected to the second on-board communication line 122.

In addition, it is assumed that a virtual management ECU 101 that manages generation, an operation, and deletion of one or a plurality of the virtual ECUs 102 is generated in the virtualization operating system 11a. The virtual management ECU 101 always operates on the virtualization operating system 11a. The virtual management ECU 101 can generate and extinct another virtual ECU 102 by using the virtualization operating system 11a. The virtual management ECU 101 can be allocated with a virtual storage unit 11 that stores the guest OS 11c, the dedicated program 11d, and the general-purpose program 11e for generating the virtual ECU 102, and can access the program, and the like. The virtual ECU 102 is a device configured to control an operation of the external device 5, and operates as a virtual on-board control device connected to the first on-board communication line 121 or the second on-board communication line 122. In other words, the virtual ECU 102 is a device that operates in substitution for the external device 5. In addition, the virtual management ECU 101 can monitor an operation state of each of a plurality of the virtual ECUs 102 through the virtualization operating system 11a. Further, the virtual management ECU 101 can recognize an attachment or detachment state of the external device 5 connected to the connection unit 13 through the virtualization operating system 11a. Furthermore, it is assumed that the virtual management ECU 101 can also access an external server A through the exterior communication device 6.

The computer program 11b is a program that performs management of the virtual ECU 102 such as generation and deletion of the virtual ECU 102 that is a device configured to control an operation of the external device 5 when the external device 5 is attached to or detached from the on-board computer 1, and operates as a virtual on-board control device connected to the first on-board communication line 121 or the second on-board communication line 122. For example, the computer program 11b is executed by the virtual management ECU 101.

The guest OS 11c is an OS for causing the virtual ECU 102 to operate. The guest OS 11c is installed in the virtual ECU 102 including virtual hardware, and functions as a basic OS of the virtual ECU 102. Examples of the guest OS 11c include Autosar, Linux (registered trademark), Android (registered trademark), QNX (registered trademark), and Ubuntu (registered trademark).

The dedicated program 11d and the general-purpose program 11e are programs which operate after being installed in the virtual ECU 102 that is a device configured to control the operation of the external device 5 and operates as the virtual on-board control device connected to the first on-board communication line 121 or the second on-board communication line 122. The dedicated program 11d is a dedicated program for causing a specific external device 5 connected to the on-board computer 1 to operate. The general-purpose program 11e is a program for realizing a basic function of various external devices 5 in a case where the dedicated program 11d of the external device 5 connected to the on-board computer 1 is not available.

Note that, the various programs may be written in the storage unit 11 at a manufacturing stage of the on-board computer 1. The on-board computer 1 may acquire programs distributed from an external server device (not illustrated), or the like through communication. Programs recorded on a recording medium such as a memory card or optical disc may be read out by the on-board computer 1 and may be stored in the storage unit 11. Programs recorded on the recording medium may be read out by a writing device and may be written in the storage unit 11 of the on-board computer 1. The various programs may be provided in a distribution aspect through a network. The various programs may be provided in an aspect recorded on the recording medium.

For example, the control unit 10 is constructed by using an arithmetic processing device such as a central processing unit (CPU) or a micro-processing unit (MPU), and reads out and executes the virtualization operating system 11a, the computer program 11b, and the like which are stored in the storage unit 11 to perform various kinds of arithmetic processing. In addition, the control unit 10 includes a timer that measures arbitrary elapsed time.

The Ethernet communication unit 12a is an Ethernet PHY unit that performs communication in compliance with a communication protocol such as 100BASE-T1 or 1000BASE-T1. The plurality of area ECUs 2 are connected to the Ethernet communication unit 12a through the first on-board communication line 121 compliant to the communication protocol. For example, as illustrated in FIG. 2, each of the area ECUs 2 is an electronic control unit that controls an operation of the terminal device 3 provided in a specific area such as a front-right, a front-left, a rear-right, and a rear-left of a vehicle C. Examples of the terminal device 3 include various sensors such as an on-board camera that images the outside of a vehicle, light detection and ranging (LIDAR), and an in-vehicle camera. The terminal device 3 may be an audio device that outputs entertainment-based image and audio. In addition, the terminal device 3 may be an electronic control unit.

Note that, an operation and various kinds of arithmetic processing of a part or all of a plurality of the terminal devices 3 can be executed on the on-board computer 1 side. However, from the viewpoint of system redundancy for securing safety, it is desirable that each of the area ECUs 2 is configured to control a minimum operation of the own device and the terminal device 3 in a case where the on-board computer 1 is abnormally stopped.

The CAN communication unit 12b is a CAN transceiver that performs communication in compliance with a CAN communication protocol. The plurality of ECUs 4 are connected to the CAN communication unit 12b through the second on-board communication line 122 compliant to the CAN communication protocol.

In a case where a plurality of the CAN communication units 12b are provided, the plurality of ECUs 4 are respectively connected to corresponding CAN communication units 12b for each of a plurality of function domains. Examples of the plurality of function domains include a cognitive domain, a judgement domain, and an operation domain. The on-board computer 1 functions as a relay device that relays data transmitted and received by the ECU 4 connected to each of the CAN communication units 12b.

The ECU 4 pertaining to the cognitive domain is connected to a sensor such as an on-board camera, a LIDAR, an ultrasonic sensor, and a millimeter wave sensor. For example, the ECU 4 converts an output value output from the sensor into a digital value, and transmits the digital value to the ECU 4 of the judgment domain through the second in-vehicle communication line.

For example, the ECU 4 pertaining to the judgement domain receives data transmitted from the ECU 4 pertaining to the cognitive domain. The ECU 4 of the judgement domain generates data for exhibiting an automatic driving function of the vehicle C on the basis of the received data, or performs data processing process. The ECU 4 of the judgement domain transmits the data generated, etc. to the ECU 4 of the operation domain through the second in-vehicle communication line.

For example, the ECU 4 pertaining to the operation domain is connected to an actuator of a motor, an engine, a brake, or the like. The ECU 4 of the operation domain receives data transmitted from the ECU 4 of the judgement domain, controls an operation of the actuator on the basis of the received data, and performs an operation, such as travelling, stoppage, or steering, of the vehicle C to exhibit the automatic driving function.

Note that, here, description has been given of an example in which the ECUs 4 connected to the CAN communication unit 12b execute the process related to the cognition, judgement, and operation, but the area ECUs 2 and the on-board computer 1 may execute the operation in cooperation with each other. Particularly, it is desirable that a process requiring large-capacity data communication is executed by the area ECUs 2 side. In addition, high-load arithmetic processing such as arithmetic processing related to artificial intelligence may be executed on the on-board computer 1 side.

The connection unit 13 is a connection port configured to detachably connect the external device 5 to the on-board computer 1. The control unit 10 or the virtual management ECU 101 monitors a state of the connection unit 13 and can detect attachment or detachment of the external device 5. In addition, the control unit 10 transmits and receives data to and from the external device 5 through the connection unit 13. For example, the connection unit 13 is a USB port capable of realizing plug and play. Note that, the connection unit 13 may be an Ethernet port or a CAN communication port. The kind of the external device 5 connected to the connection unit 13 is not particularly limited, and the external device 5 may have a configuration that includes, for example, a processor, a memory, and a communication circuit, and is capable of transmitting and receiving data to and from the control unit 10 of the on-board computer 1.

The input/output I/F 14 is an interface for communication with the exterior communication device 6, the display device 7, and the like. The exterior communication device 6 and the display device 7 is connected to the input/output I/F 14 through a wire harness such as a serial cable.

The exterior communication device 6 is a communication device that includes an antenna 60 for performing radio communication and performs the radio communication through an Internet communication network such as WiFi, and a mobile communication network such as 3G, LTE, 4G, and 5G. For example, the exterior communication device 6 is a telematics control unit (TCU). For example, the exterior communication device 6 transmits and receives data to and from the external server A. The external server A stores the dedicated program 11d necessary to cause the external device 5 to operate as the virtual ECU 102. The exterior communication device 6 makes a request for distribution of the necessary dedicated program 11d to the external server A, and the external server A wirelessly transmits the dedicated program 11d to an on-board communication device in correspondence with the request. The on-board computer 1 can acquire the dedicated program 11d by the exterior communication device 6.

Note that, in this embodiment, description has been given on the assumption that the exterior communication device 6 and the on-board computer 1 are individual bodies, but the on-board computer 1 may have a configuration or a function of the exterior communication device 6.

In addition, the external server A may be an OTA server. The external server A transmits update programs for updating programs of the on-board computer 1, the area ECUs 2, the ECUs 4, and the like, and the guest OS 11c, the dedicated program 11d, and the general-purpose program 11e for the virtual ECU 102. The on-board computer 1 receives the update programs transmitted from the external server A. The on-board computer 1 updates various programs of the on-board computer 1 that is an own device, the area ECUs 2, the ECUs 4, and the virtual ECU 102 by using the received update program.

For example, the display device 7 is a human machine interface (HMI) device such as a display of a car navigation. The display device 7 displays data or information output from the control unit 10 of the on-board computer 1 through the input/output I/F 14.

Figure 4:
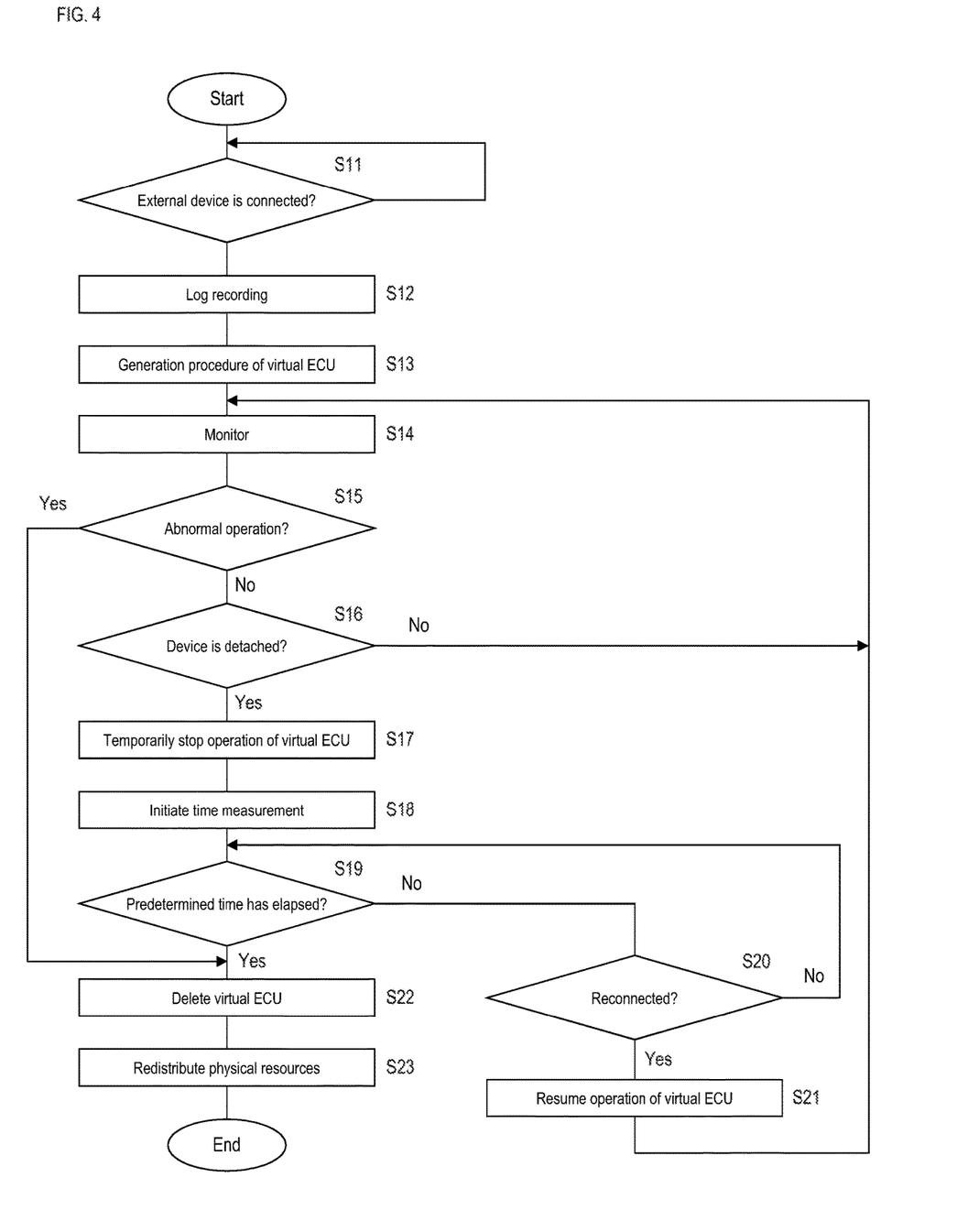
FIG. 4 is a flowchart illustrating a management procedure of a virtual ECU.

FIG. 4 is a flowchart illustrating a management procedure of the virtual ECU 102. The virtual management ECU 101 determines whether or not the external device 5 is connected to the connection unit 13 (step S11). In a case where it is determined that the external device 5 is not connected (step S11: NO), the virtual management ECU 101 returns the process to step S11, and waits.

In a case where it is determined that the external device 5 is connected to the connection unit 13 (step S11: YES), recording of logs related to generation, operation, and deletion of the virtual ECU 102 is initiated (step S12). Note that, the virtual ECU 102 may be configured to record the logs always regardless of establishment of connection of the external device 5.

Next, the virtual management ECU 101 executes a process of generating the virtual ECU 102 that is a device configured to control the operation of the external device 5 connected to the connection unit 13 and operates as a virtual on-board control device connected to the first on-board communication line 121 or the second on-board communication line 122 by using the virtualization operating system 11a (step S13).

The process of generating the virtual ECU 102 will be described.

Figure 5:
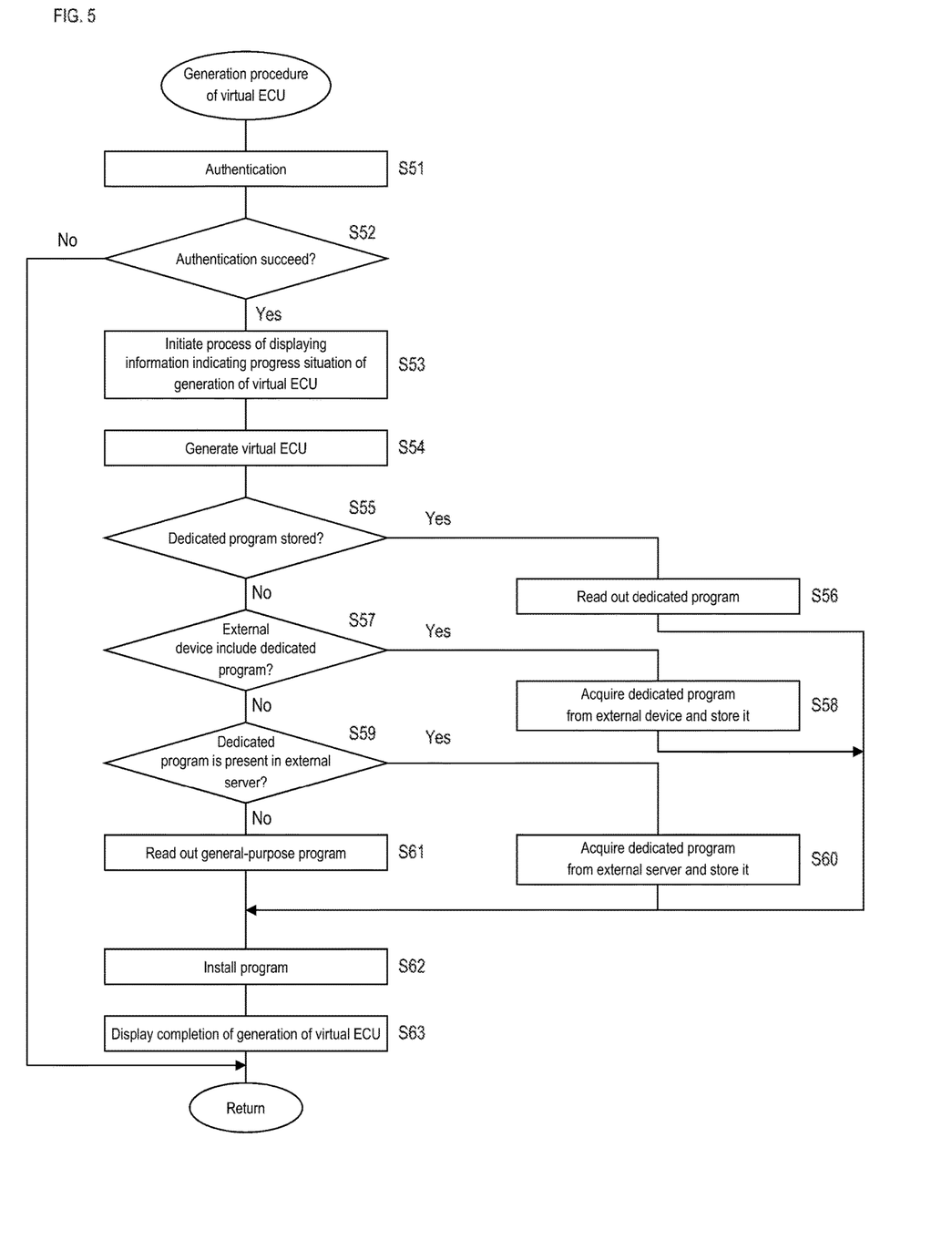
FIG. 5 is a flowchart illustrating a generation procedure of the virtual ECU.
Figure 6:
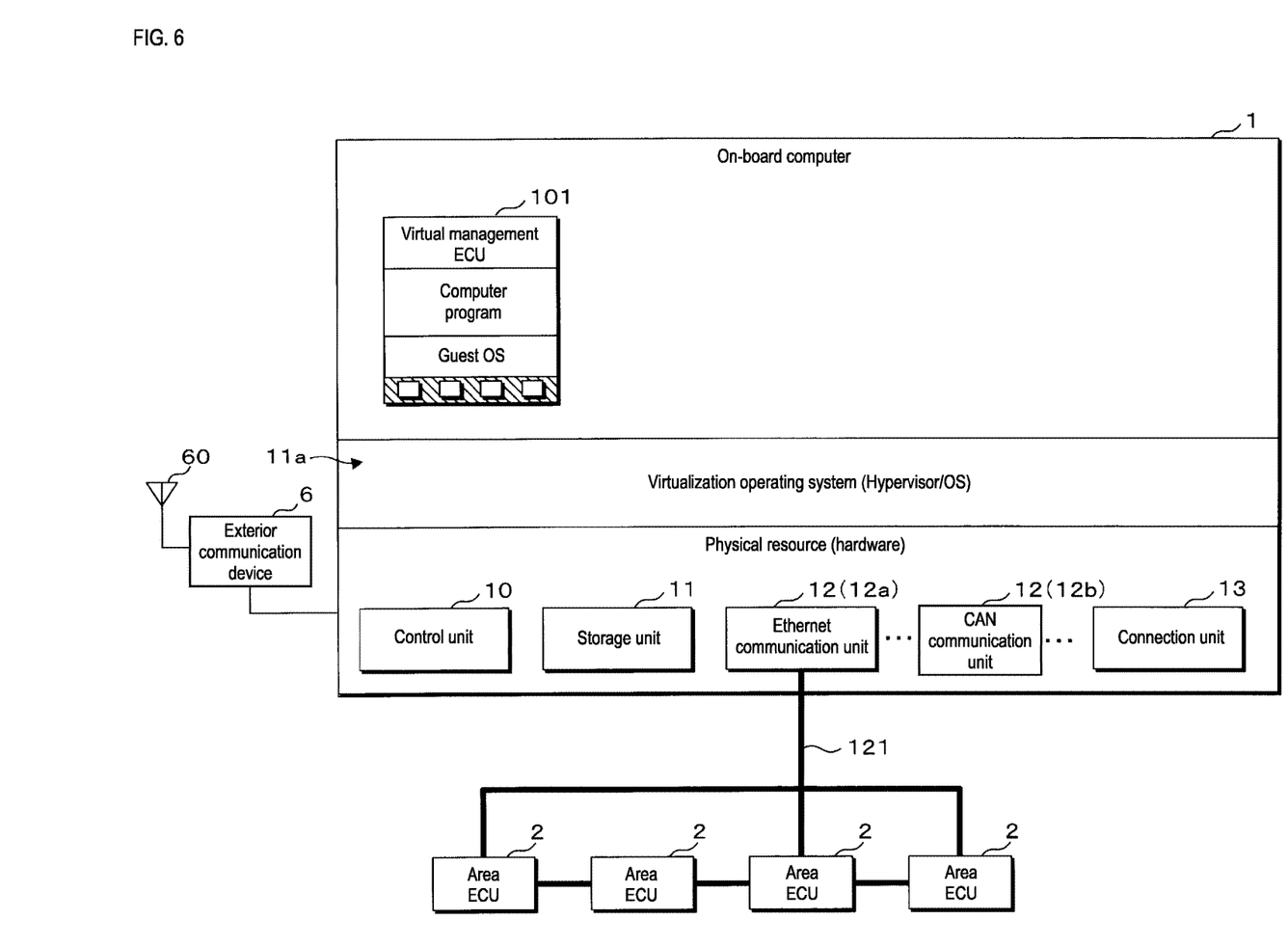
FIG. 6 is a functional block diagram illustrating a state before the virtual ECU is generated.
Figure 7:
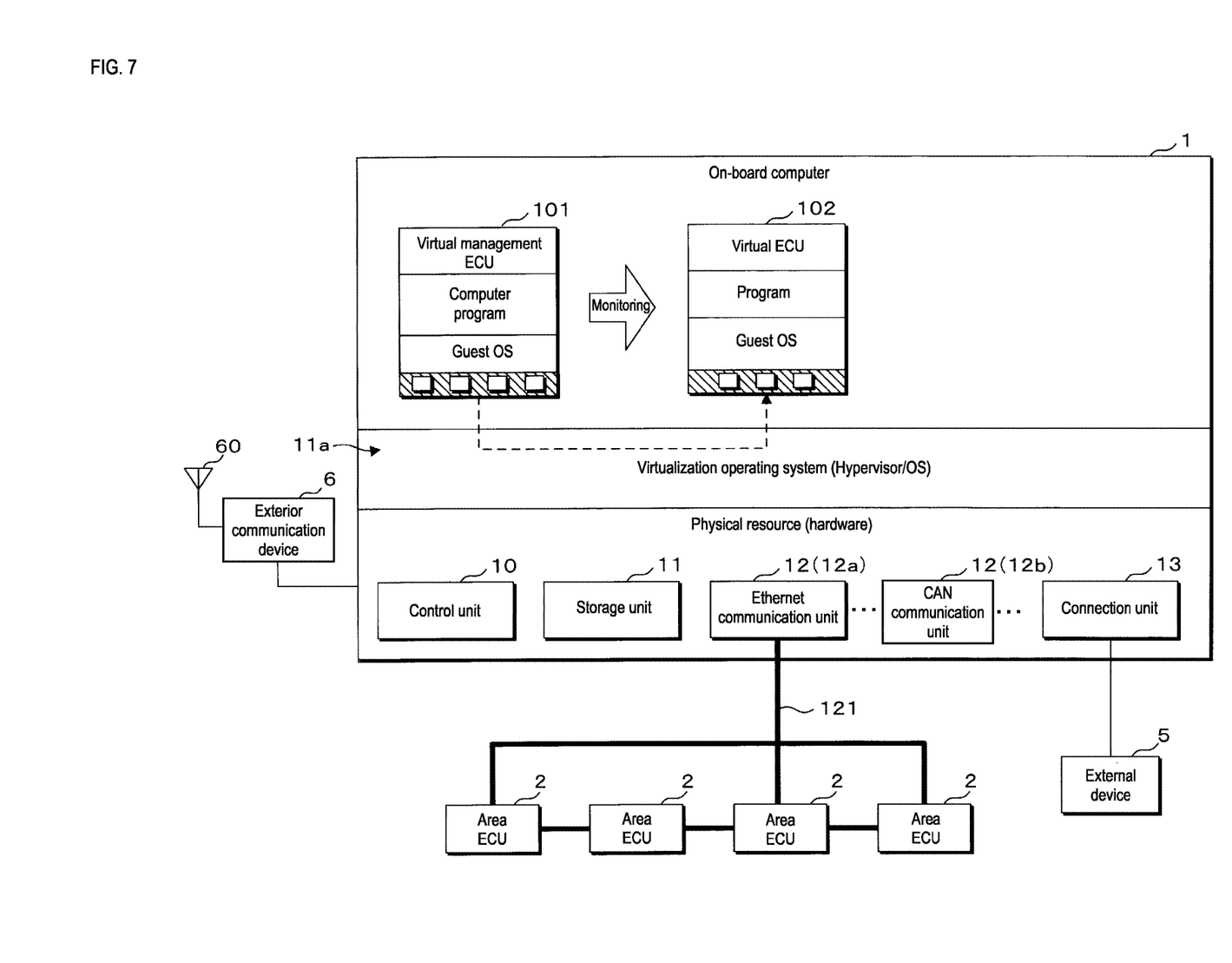
FIG. 7 is a functional block diagram illustrating a state in which the virtual ECU has been generated.

FIG. 5 is a flowchart illustrating a generation procedure of the virtual ECU 102, FIG. 6 is a functional block diagram illustrating a state before the virtual ECU 102 is generated, and FIG. 7 is a functional block diagram illustrating a state in which the virtual ECU 102 has been generated.

The virtual management ECU 101 performs authentication of the connected external device 5 (step S51), and determines whether or not authentication succeeds (step S52). Authentication of the external device 5 may be performed by a known method. For example, authentication is performed by determining whether or not identification information of the external device 5 such as an MAC address, an IP address, and a predetermined device code matches information registered in advance in the on-board computer 1, the ECU 4 that executes a process related to authentication, or an external authentication server. Hereinafter, the virtual management ECU 101 can perform communication with the external device 5 as necessary, but another virtual ECU 102 cannot perform information exchange with the external device 5, and communication through the virtual management ECU 101 is also limited.

In a case where it is determined that authentication of the external device 5 fails (step S52: NO), the virtual management ECU 101 does not generate the virtual ECU 102, and terminates the process.

In a case where it is determined that authentication of the external device 5 succeeds (step S52: YES), the virtual management ECU 101 initiates a process of displaying information indicating a progress situation of the process of generating the virtual ECU 102 on the display device 7 (step S53). Specifically, the virtual management ECU 101 transmits information indicating initiation of generation of the virtual ECU 102 to the display device 7. Then, the virtual management ECU 101 transmits information related to that a virtual environment has been generated, information related to that the guest OS 11c has been installed, information related to that a program for the external device 5 has been installed, information related to that the virtual ECU 102 has become operable, or the like to the display device 7. In addition, the virtual management ECU 101 may estimate required time until the virtual ECU 102 becomes operable, and may transmit information indicating predicted time up to operation initiation to the display device 7. The display device 7 receives information transmitted from the virtual management ECU 101 and displays an image based on the information.

Next, the virtual management ECU 101 constructs a virtual environment by allocating necessary physical resources to the virtual ECU 102 that is a device configured to control an operation of the external device 5 and operates as a virtual on-board control device connected to the first on-board communication line 121 or the second on-board communication line 122 by using the virtualization operating system 11a, and generates the virtual ECU 102 (step S54).

Next, the virtual management ECU 101 determines whether or not the storage unit 11 stores the dedicated program 11d necessary to cause the external device 5 to operate on the basis of identification information of the external device 5 (step S55). In a case where it is determined that the storage unit 11 stores the dedicated program 11d (step S55: YES), the virtual management ECU 101 reads out the dedicated program 11d from the storage unit 11 (step S56).

In step S55, in a case where it is determined that the storage unit 11 does not store the dedicated program 11d (step S55: NO), the virtual management ECU 101 determines whether or not the external device 5 includes the dedicated program 11d by performing communication with the external device 5 (step S57). In a case where it is determined that the external device 5 includes the dedicated program 11d (step S57: YES), the dedicated program 11d is acquired from the external device 5, and the acquired dedicated program 11d is stored in the storage unit 11 (step S58). In addition, the virtual management ECU 101 stores a correspondence relationship between the identification information of the external device 5 and the dedicated program 11d in the storage unit 11.

In step S57, in a case where it is determined that the external device 5 does not include the dedicated program 11d (step S57: NO), the virtual management ECU 101 determines whether or not the dedicated program 11d is present in the external server A (step S59). Specifically, the virtual management ECU 101 inquires of the external server A about presence or absence of the dedicated program 11d for the external device 5 by using identification information of the terminal device 3 to confirm presence or absence of the dedicated program 11d.

In a case where it is determined that the dedicated program 11d is present in the external server A (step S59: YES), the virtual management ECU 101 acquires the dedicated program 11d for the external device 5 from the external server A and stores the dedicated program 11d in the storage unit 11 (step S60). The virtual management ECU 101 stores a correspondence relationship between the identification information for the external device 5 and the dedicated program 11d in the storage unit 11.

In step S59, in a case where it is determined that the dedicated program 11d is not present in the external server A (step S59: NO), the virtual management ECU 101 refers to the table and reads out the general-purpose program 11e suitable for the external device 5 from the storage unit 11 (step S61).

The virtual management ECU 101 that has terminated the process in steps S56, S58, S60, or S61 installs the guest OS 11c in the virtual ECU 102, and subsequently installs the dedicated program 11d or the general-purpose program 11e (step S62). That is, the virtual ECU 102 stores the guest OS 11c, and the dedicated program 11d or the general-purpose program 11e in the allocated storage unit 11 (virtual storage unit).

Then, in a case where generation of the virtual ECU 102 related to the external device 5 is completed, the virtual management ECU 101 transmits information indicating completion of the generation of the virtual ECU 102 to the display device 7, and terminates the process of generating the virtual ECU 102 (step S63).

Through the above-described processes, the virtual ECU 102 is generated as illustrated in FIG. 6 and FIG. 7. FIG. 6 illustrates a state in which the external device 5 is not connected to the connection unit 13, and only the virtual management ECU 101 operates. In this state, when the external device 5 is connected to the connection unit 13 as illustrated in FIG. 7, the virtual management ECU 101 issues a command or the like to the virtualization operating to generate the virtual ECU 102 that is a device configured to control the operation of the external device 5 and operates as a virtual on-board control device connected to the first on-board communication line 121 or the second on-board communication line 122. Then, the virtual ECU 102 can communicate with another virtual ECU 102 generated on the virtualization operating system 11a, the area ECU 2 connected to the first on-board communication line 121, the ECU 4 connected to the second on-board communication line 122, and the like. Of course, the virtual management ECU 101 appropriately limits a range that the external device 5 can access by the virtual ECU 102. In addition, on the contrary, a range that the area ECU 2 and the ECU 4 can access by the virtual ECU 102 of the external device 5 is also managed. The virtual management ECU 101 may appropriately separate the virtual ECU 102 related to the external device 5 by VLAN.

As illustrated in FIG. 4, the virtual management ECU 101 that completes the process of generating the virtual ECU 102 monitors an operation of the generated virtual ECU 102 (step S14), and determines whether or not the operation of the virtual ECU 102 is abnormal. Specifically, the virtualization operating monitors the usage amount of the physical resources allocated to the virtual ECU 102, an access operation to the outside, and the like, and provides information obtained through the monitoring to the virtual management ECU 101. The virtual management ECU 101 acquires information related to the monitoring result from the virtualization operating system 11a, and determines whether or not the operation of the virtual ECU 102 is abnormal on the basis of the acquired information.

In a case where it is determined that the operation of the virtual ECU 102 is abnormal (step S15: YES), the virtual management ECU 101 deletes the virtual ECU 102 (step S22).

In a case where it is determined that the operation of the virtual ECU 102 is normal (step S15: NO), the virtual management ECU 101 determines whether or not the external device 5 is detached from the connection unit 13 (step S16). In a case where it is determined that the external device 5 is not detached (step S16: NO), the virtual management ECU 101 returns the process to step S14.

In a case where it is determined that the external device 5 is detached (step S16: YES), the virtual management ECU 101 temporarily stops the operation of the virtual ECU 102 corresponding to the detached external device 5 (step S17), and initiates time measurement (step S18). That is, the virtual management ECU 101 does not instantly delete the virtual ECU 102, and retains the virtual ECU 102 in a state in which the operation can be resumed.

Then, the virtual management ECU 101 determines whether or not predetermined time has elapsed after the external device 5 is detached (step S19). In a case where it is determined that predetermined time has elapsed (step S19: YES), the virtual management ECU 101 deletes the virtual ECU 102 corresponding to the detached external device 5 (step S22).

Figure 8:
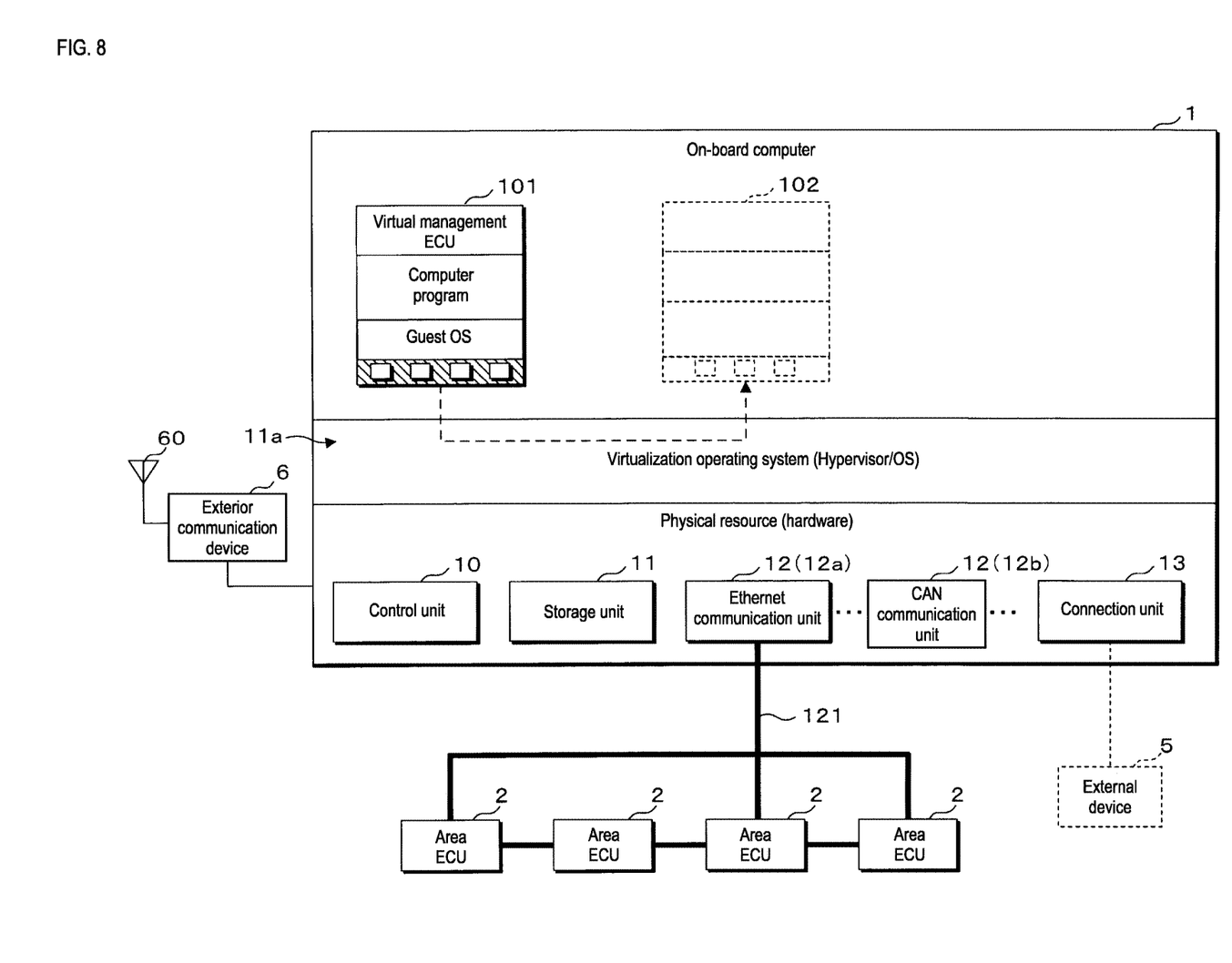
FIG. 8 is a functional block diagram illustrating a state in which the virtual ECU has been deleted.

FIG. 8 is a functional block diagram illustrating a state in which the virtual ECU 102 has been deleted. As illustrated in FIG. 7 and FIG. 8, in a case where the external device 5 is detached from the connection unit 13 and predetermined time has elapsed, the virtual ECU 102 corresponding to the external device 5 is deleted.

Then, the physical resources of the deleted virtual management ECU 101 are redistributed (step S23), and the process is terminated.

In a case where it is determined that predetermined time has not elapsed (step S19: NO), it is determined whether or not the external device 5 corresponding to the virtual ECU 102 of which operation is stopped is connected again to the connection unit 13 (step S20). Reconnection of the external device 5 may be determined on the basis of the identification information of the external device 5.

In a case where it is determined that the external device 5 is not reconnected (step S20: NO), the virtual management ECU 101 returns the process to step S19. In a case where it is determined that the external device 5 is reconnected (step S20: YES), the virtual management ECU 101 resumes the operation of the virtual ECU 102 corresponding to the reconnected external device 5 (step S21), and returns the process to step S14.

According to the on-board computer 1, the computer execution method, and the computer program 11b configured as described above, in a case where the external device 5 is connected to the on-board computer 1, it is possible to cause the external device 5 to operate in a secure manner. In addition, the external device 5 can be connected to the on-board network in an aspect capable of performing a cooperative operation with another on-board control device.

Since the virtual ECU 102 of the external device 5 is generated after authentication of the external device 5 has been performed, security can be improved.

Since the program for causing the external device 5 to operate as the virtual ECU 102 is acquired from the external server A, the capacity of the storage unit 11 can be reduced.

Since the program for causing the external device 5 to operate as the virtual ECU 102 is acquired from the external device 5, the capacity of the storage unit 11 can be reduced.

Since the information for displaying a progress situation of the process of generating the virtual ECU 102 is transmitted, a user can confirm the progress related to the process of generating the virtual ECU 102.

In a case where the external device 5 is detached from the connection unit 13, the virtual ECU 102 can be deleted, and the physical resources can be released.

In a case where the external device 5 is detached from the connection unit 13, the virtual ECU 102 is deleted after waiting elapse of predetermined time, and thus in a case where the external device 5 is reconnected within the predetermined time, the virtual ECU 102 related to the external device 5 can be used instantly.

In a case where the operation of the virtual ECU 102 is abnormal, the virtual ECU 102 can be deleted. Accordingly, security of the on-board system can be improved.

Logs related to generation, operation, and deletion of the virtual ECU 102 can be left.

In this embodiment, description has been given of an example in which a virtual environment is constructed by using the hypervisor type virtualization operating system 11a, but the virtual environment may be constructed by using host OS type virtualization software, that is, virtualization software operating on a basic OS.

The invention claimed is:

1. An on-board computer comprising:
a physical resource including a communication unit which communicate with an on-board control device through an on-board communication line, a control unit, and a storage unit;
a connection unit to which an external device is to be connected; and
a management processing unit configured to generate a virtual control device by allocating the physical resource in a case where the external device is connected to the connection unit,
wherein the virtual control device operates as a virtual on-board control device that includes a virtual communication unit, a virtual control unit, and a virtual storage unit which communicate with the on-board control device, controls an operation of the external device connected to the connection unit, and that is connected to the on-board communication line.

2. The on-board computer according to claim 1, wherein the management processing unit performs authentication of the external device in a case where the external device is connected to the connection unit, and generates the virtual control device in a case where authentication succeeds.

3. The on-board computer according to claim 1, wherein the management processing unit, acquires a program for causing the virtual control device related to the external device to operate from an external server, and provides the acquired program to the virtual control device.

4. The on-board computer according to claim 1, wherein the management processing unit, acquires a program for causing the virtual control device related to the external device to operate from the external device, and provides the acquired program to the virtual control device.

5. The on-board computer according to claim 1, wherein the management processing unit transmits information for displaying progress of a process of generating the virtual control device.

6. The on-board computer according to claim 1, wherein the management processing unit deletes the virtual control device in a case where the external device is detached from the connection unit.

7. The on-board computer according to claim 1, wherein the virtual control device is retained before elapse of predetermined time from detachment of the external device from the connection unit, and the virtual control device is deleted after elapse of the predetermined time.

8. The on-board computer according to claim 1, wherein the management processing unit monitors an operation of the virtual control device, and deletes the virtual control device in a case where the operation of the virtual control device is abnormal.

9. The on-board computer according to claim 6, wherein the management processing unit stores logs of generation, operation, and deletion of the virtual control device.

10. A computer execution method,
wherein an on-board computer including a physical resource including a communication unit which communicate with an on-board control device through an on-board communication line, a control unit, and a storage unit, and a connection unit to which an external device is to be connected executes processes of,
determining whether or not the external device is connected to the connection unit, and
generating a virtual control device by allocating the physical resource in a case where a determination is made as establishment of connection of the external device to the connection unit, and
the virtual control device operates as a virtual on-board control device that includes a virtual communication unit, a virtual control unit, and a virtual storage unit which communicate with the on-board control device, controls an operation of the external device connected to the connection unit, and that is connected to the on-board communication line.

11. A computer program product implemented on an on board computer, the on-board computer including a physical resource having a communication unit which communicate with an on-board control device through an on-board communication line, a control unit, and a storage unit, and a connection unit to which an external device is to be connected to, the computer program product comprising a non-transitory, machine-readable medium storing instructions which, when executed by at least one programmable processor, causes at least one programmable processor to execute processes of:
determining whether or not the external device is connected to the connection unit;
generating a virtual control device by allocating the physical resource in a case where a determination is made as establishment of connection of the external device to the connection unit; and
causing the virtual control device to operate as a virtual on-board control device that includes a virtual communication unit, a virtual control unit, and a virtual storage unit which communicate with the on-board control device, controls an operation of the external device connected to the connection unit, and that is connected to the on-board communication line.

* * * * *